April 17, 1973  A. MARZOCCHI  3,728,146
GLASS FIBER REINFORCED ELASTOMERS
Filed March 22, 1971
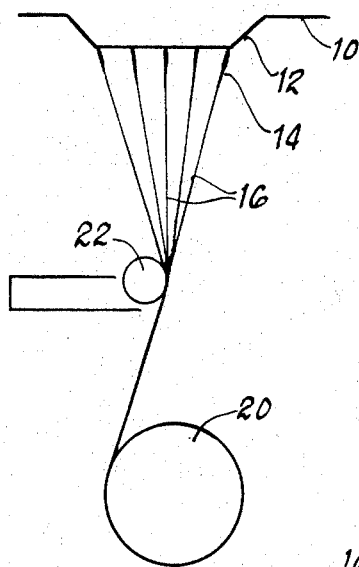
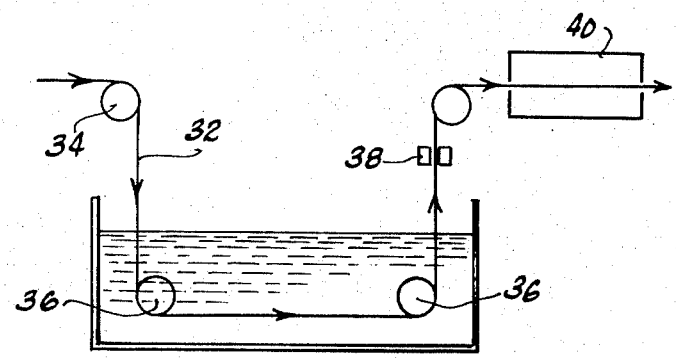
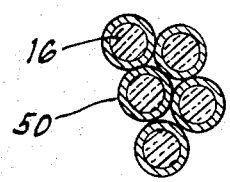
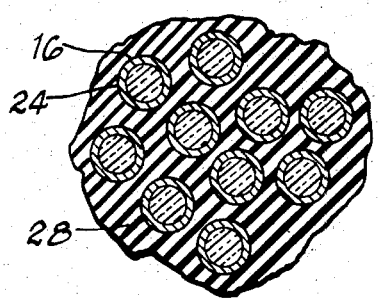
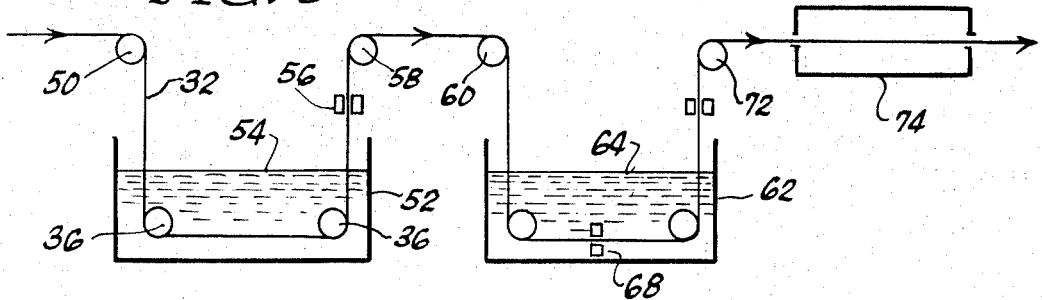
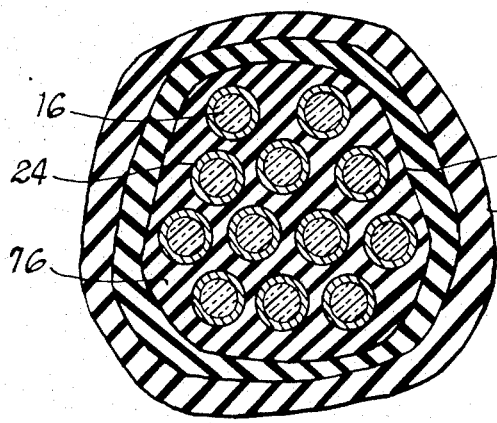
INVENTOR
Alfred Marzocchi
by Staelin & Overman
Attys

United States Patent Office 3,728,146
Patented Apr. 17, 1973

3,728,146
GLASS FIBER REINFORCED ELASTOMERS
Alfred Marzocchi, Cumberland, R.I., assignor to Owens-Corning Fiberglas Corporation, Toledo, Ohio
Filed Mar. 22, 1971, Ser. No. 126,821
Int. Cl. C03c 25/02
U.S. Cl. 117—72
28 Claims

ABSTRACT OF THE DISCLOSURE

Glass fibers for use in glass fiber-reinforced elastomeric materials and methods for preparing same wherein a glass fiber bundle is first impregnated with an elastomer or resinous polymer and then is coated with an elastomer compatible material for forming an impregnated glass fiber bundle having an inner coating comprising an elastomer or resinous polymer and an outer coating of the elastomer compatible material.

---

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like, elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubber.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber tires, and as a reinforcement and the like in other elastomeric coated fabrics and molded elastomeric products.

It is an object of this invention to provide a new and improved method for treatment of glass fibers in the form of yarns, cords, strands and fabrics, hereinafter referred to as bundles, wherein the individual glass fibers may or may not contain a thin size coating thereon, to enable fuller utilization to be made of the desirable characteristics of the glass fibers when used in combination with elastomeric materials in the manufacture of glass fiber reinforced molded products and coated fabrics.

More specifically, it is an object of this invention to provide a method for the treatment of glass fibers to improve the processing and the performance characteristics of the glass fibers as a reinforcement for elastomeric materials and for treatment of bundles, strands, yarns, cords and fabrics of glass fibers, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which—

FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

FIG. 2 is a flow diagram illustrating the treatment of glass fibers subsequent to their being formed into bundles, strands, yarns, cords or fabrics to impregnate the glass fiber bundles in accordance with the preferred practice of this invention;

FIG. 3 is a cross-sectional view of glass fibers processed in accordance with the diagram illustrated in FIG. 1;

FIG. 4 is a cross-sectional view of a bundle of glass fibers processed in accordance with the flow diagram of FIG. 2;

FIG. 5 is a flow diagram illustrating the treatment of glass fiber bundles similar to that of FIG. 2 in which the bundle is double impregnated; and FIG. 6 is a cross-sectional view of a bundle of glass fibers treated in accordance with the flow diagram of FIG. 5.

Until recently, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties were previously made available from the combinations which made use of glass fibers in products formed of elastomeric materials. It is believed that the failure to make fuller utilization on some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

In copending application, Ser. No. 398,305, filed Sept. 22, 1964, now abandoned, description is made of a method for impregnating glass fibers in the form of yarns, strands, cords or fabrics wherein the glass fiber bundle is impregnated with a resorcinol aldehyde-latex which penetrates the glass fiber bundle to separate the fibers one from the other and to prevent destruction of the fibers by mutual abrasion. When the impregnated glass fiber bundle is combind with elastomeric materials in the manufacture of glass fiber-reinforced elastomeric products, the resorcinol aldehyde-latex operates to intertie the glass fiber bundle with the elastomeric material.

The resorcinol aldehyde-latex system, hereinafter referred to as "RFL" has the disadvantage that the amount of RFL loaded in the glass fiber bundle as an impregnant is limited by the tendency of the RFL impregnant to be dislodged when the glass fiber bundle is subjected to a change in direction, as when the bundle is passed over the roller or the like. In addition, the RFL system, as applied in the aforementioned copending application, has the further disadvantage that it results in a high degree of variation in the tensile strength of the glass fiber bundle when under compressive forces.

It has now been found that the tensile strength of glass fibers in the form of a bundle can be unexpectedly increased by treating a glass fiber bundle with a cross linking elastomer compatible material or an elastomer compatible material which is capable of cross linking or self-cure upon drying.

The following examples will serve to illustrate the principal concepts of this invention in a method for the treatment by impregnation of glass fiber bundles wherein the glass fibers have preferably, though not necessarily, been sized in forming with a conventional size composition which has preferably been modified to embody a glass fiber-elastomer anchoring agent.

EXAMPLE 1

Forming size composition

| | Percent by weight |
|---|---|
| Partially dextrinized starch | 8.0 |
| Hydrogenated vegetable oil | 1.8 |
| Cationic wetting agent (lauryl amine acetate) | 0.4 |
| Nonionic emulsifying agent | 0.2 |
| Gamma-aminopropyltriethoxy silane | 1.0 |
| Water | 88.6 |

EXAMPLE 2

Forming size composition

| | Percent by weight |
|---|---|
| Saturated polyester resin | 3.2 |
| Fatty acid amine wetting agent (Nopcogen 16 L) | 0.1 |
| Polyvinyl alcohol | 0.1 |
| Pyrrolidine | 3.0 |
| Gamma-aminopropyltriethoxy silane | 0.3 |
| Glacial acetic acid | 0.1 |
| Water | 93.2 |

EXAMPLE 3

Forming size composition

| | Percent by weight |
|---|---|
| Paraffin wax in aqueous emulsion | 0.2 |
| Cationic amide polyester resin | 1.3 |
| Polyglycol condensate (300 to 400 mw.) | 2.3 |
| Gelatin | 0.25 |
| Gamma-aminopropyltriethoxy silane | 0.5 |
| Dibasic ammonium phosphate | 0.1 |
| Glacial acetic acid | 0.2 |
| Water | 95.15 |

EXAMPLE 4

Forming size composition

| | Percent by weight |
|---|---|
| Gamma-aminopropyltriethoxy silane | 0.5 |
| Fatty acid amine wetting agent (Nopcogen 16 L) | 0.25 |
| Water | 99.25 |

Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 15 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying or the thin size coating can be accelerated by exposure to elevated temperature, such as a temperature within the range of 150° to 250° F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads, or cords which may be used as a reinforcement for elastomeric materials, with or without cutting to shorter lengths, and which can be formed into woven or non-woven fabrics for subsequent combination with elastomeric materials.

After the fibers have been processed into strands, yarns, cords or fabrics, hereinafter referred to generally as bundles, the bundles of sized glass fibers are treated in accordance with the process of the present invention as represented by the following examples.

EXAMPLE 5

This example illustrates the use of a carboxylated butadiene-styrene latex, which has been cross linked with an amine, as an impregnating composition to provide an impregnated glass fiber bundle having increased tensile strength.

A carboxylated butadiene-styrene latex having a solids content of 45%, marketed by Goodyear under the trademark of Pliolite 480, is admixed with hexamethylene diamine in a ratio of 5 parts by weight diamine to 100 parts by weight latex. The resulting mixture is then heated to a temperature of 85° C. for a period of one hour. At the end of this period, the latex has a significantly increased viscosity.

Thereafter, the resulting partially cross-linked latex is formulated into the following impregnating composition:

| | Percent by weight |
|---|---|
| Amine cross-linked carboxylated butadiene styrene latex (55% solids) | 30.0 |
| Water | 70.0 |

Impregnation of a bundle of glass fibers, which may or may not contain a thin size coating of one of the size compositions of Examples 1–4, can be made by conventional means for impregnation, such as by immersion of the bundles in a bath of the aqueous impregnating composition.

Referring more specifically to FIG. 2 of the drawing, the glass fiber bundle 32 is advanced over a guide roller 34 for passage downwardly into the bath 35 containing the impregnating composition of Example 4. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter the endless bundle is advanced over the roller 39 into a drying oven preferably in the form of an air drying oven maintained at a temperature within the range of 65° to 180° C. to accelerate removal of the aqueous diluent and to set the impregnating material in situ in the glass fiber bundle. Drying will occur in a relatively short period of time, generally within 1–30 minutes, depending somewhat on the temperature of drying.

The resulting impregnated bundle is shown in FIG. 4, and comprises a plurality of glass fibers 16 having a thin size coating 24 thereon and the impregnant 28 dispersed throughout. As is illustrated in this figure, the impregnant serves to further physically separate the glass fibers each from the other, and yet provide a unitized glass fiber bundle.

The reaction between the carboxylated butadiene-styrene latex can be effected by heating the mixture of the latex and the amine to a temperature of at least 50° C., and preferably to a temperature within the range of 65° to 180° C. The reaction will take place in a relatively short time, generally within 1 minute to 3 hours, depending somewhat upon the temperature.

In accordance with the preferred practice of the present invention, the amine cross linking agent is formulated in the impregnating composition without pre-reaction with the latex whereby cure or cross-linking takes place during drying of the impregnated bundle. The preferred practice of the invention may be illustrated by the following example.

EXAMPLE 6

An impregnating composition using the carboxylated butadiene-styrene latex employed in Example 5 is formulated in accordance with the following:

|  | Parts by weight |
|---|---|
| Carboxylated butadiene-styrene latex (50% solids) | 35 |
| Hexamethylene diamine | 3 |
| Water | 62 |

The foregoing impregnating composition is applied to a bundle of unsized glass fibers in the manner described in Example 5 in an amount to deposit dry solids constituting between 5–30% by weight of the glass fiber system. Drying is effected at a temperature of 110° C. for 20 minutes whereby the diamine reacts with the carboxyl groups in the latex to provide a cross-linked impregnant in the glass fiber bundle.

The amount of amine employed relative to the latex, whether or not the amine is reacted with the latex prior to application of the latex to the glass fiber bundle, is not critical and can be varied within wide ranges. It has been found that best results are usually achieved when the amine is employed in a ratio of between 1 and 50 parts by weight per 100 parts by weight of the latex. The resulting impregnating composition is preferably formulated into an aqueous dispersion having a solids content of 5–25% by weight.

It will be understood by those skilled in the art that a wide variety of amines can be employed in lieu of the hexamethylene diamine exemplified in Examples 5 and 6. For example, use can be made of the alkylene diamines $$NH_2—R—NH_2$$

wherein R is an alkylene group having 1–10 carbon atoms, such as methylene, dimethylene, trimethylene, etc. Representative compounds falling within this group are methylene diamine, ethylene diamine, trimethylene diamine, etc.

Another class of compounds suitable for use in the present invention includes the ethylene polyamines, such as diethylene triamine, triethylene tetraimine, tetraethylene pentamine, etc. Also inlcuded within the scope of the present invention are the polyethylene imines of the formula:

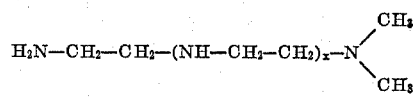

wherein x is an integer. The latter materials range from low molecular liquids to heavy liquids of solids having relatively high molecular weights.

Still another group of compounds suitable for use in the practice of the present invention are the diamino organo silicon compounds of the formula:

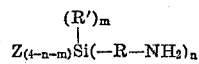

wherein R is a divalent organic group, R' is lower alkyl such as methyl, ethyl, propyl, etc., n is an integer from 2 to 3, m is an integer from 0 to 1 and Z is hydrogen or a readily hydrolyzable group such as halogen (e.g. chlorine, bromine, fluorine or iodine) or alkoxy having 1–4 carbon atoms, such as methoxy, ethoxy, propoxy, etc.

R can be a variety of divalent organic radicals including alkylene having 1–8 carbon atoms, such as methylene, ethylene, trimethylene, tetramethylene, etc.; alkenylene having 2–6 carbon atoms including ethenylene, propenylene, etc.; cycloalkylene, having 5–8 carbon atoms, such as cyclopentylene, cyclohexylene, etc.; arylene, such as phenylene or naphthalene, or amino alkylene groups of the formula:

—$R_1$—NH—
—$R_2$—NH—$R_3$—NH— or
—$R_4$—NH—$R_5$—NH—$R_6$—NH— wherein $R_1$, $R_2$, $R_3$, $R_4$, $R_5$ and $R_6$ are alkylene groups each having 1–4 carbon atoms such as methylene, ethylene, trimethylene, etc. Also included are the corresponding silanols and polysiloxanes as well as the silanes described.

Representative of the foregoing diamino silanes are bis-(gamma-aminopropyl)diethoxy silane,
bis-(beta-aminoethyl)dimethoxy silane,
bis-(beta-aminovinyl)dichloro silane,
bis-(gamma-aminoalkyl)dimethoxy silane,
bis-(3-aminocyclohexyl)diethoxy silane,
tris-(gamma-aminopropyl)methoxy silane,
bis-(3-aminophenyl)dichlorosilane,
bis[N-(beta-aminoethyl)-gamma-aminopropyl]
    dimethoxy silane, as well as many others.

Additional examples of the use of carboxylated butadiene-styrene latices modified by the foregoing diamines as impregnants are illustrated by the following.

EXAMPLE 7

The carboxylated butadiene-styrene latex utilized in Example 5 is reacted with diethylene triamine in a ratio of 10 parts by weight of the amine per 100 parts by weight of the latex at a temperature of 85° C. for 0.5 hour.

The resulting latex is then formulated into the following impregnant composition:

|  | Percent by weight |
|---|---|
| Amine latex reaction product (57% solids) | 25.0 |
| Water | 75.0 |

Application of the above impregnating composition can be made in the manner described in Example 5.

EXAMPLE 8

An impregnating composition containing the latex of Example 5 is formulated as follows:

|  | Parts by weight |
|---|---|
| Carboxylated butadiene-styrene latex (50% solids) | 30.0 |
| Polyethyleneimine (average molecular weight 235) | 1.5 |
| Water | 68.5 |

The foregoing impregnating composition is applied to a glass fiber bundle in the manner described in Example 5. Drying is carried out at a temperature of 120° C. whereby the polyethylene imine reacts with the carboxyl groups in the latex to form a cross linked impregnant in the glass fiber bundle to impart improved strength to the bundle.

EXAMPLE 9

An impregnating composition embodying a carboxylated butadiene-styrene latex is formulated to include the following:

| | Parts by weight |
|---|---|
| Latex | 30.0 |
| Bis-(gamma-aminopropyl) diethoxy silane | 2.5 |
| Water | 67.5 |
| Quaternary ammonia hydroxide | 3.0 |

Application of the foregoing impregnating composition is made in the manner described in Example 5, followed by drying at 90° C. for 0.5 hour.

It will be understood by those skilled in the art that various other polymeric materials which are compatible with elastomeric material and which are reactive toward the foregoing amines can be used in place of the carboxylated butadiene-styrene polymers described above. For example, use can be made of melamine-aldehyde resins, polyepoxide resins and polyurethane resins, acrylic resins (e.g. polymers and copolymers of acrylic acid), and polyesters as illustrated by the following examples.

EXAMPLE 10

A low molecular weight resin (average molecular weight 1433) formed by the condensation of melamine with formaldehyde is dispersed in water, and trimethylene diamine is added in an amount to provide a ratio of 10 parts of amine per 100 parts resin. The mixture is heated to 95° C. for one hour to permit the amine to react with the resin. An increase in the solids content of the mixture is observed as the reaction proceeds.

The resins is then formulated into the following impregnating composition:

| | Percent by weight |
|---|---|
| Melamine-formaldehyde resin-diamine reaction product (60% solids) | 30.0 |
| Water | 70.0 |

The foregoing impregnating composition is then applied to a glass fiber bundle formed of unsized glass fibers in the manner described in Example 5 in an amount to deposit dry solids constituting between 5 and 30% by weight of the glass fiber system.

EXAMPLE 11

An impregnating composition embodying the modified melamine-formaldehyde resin used in Example 10 is formulated into the following impregnating composition.

| | Parts by weight |
|---|---|
| Melamine-formaldehyde resin | 25.0 |
| Bis-(beta-aminoethyl)dimethoxy silane | 2.0 |
| Water | 73.0 |

The foregoing composition is applied to a bundle of glass fiber, and the resulting impregnated bundle is dried at a temperature of 125° C. for 0.5 hour to cause the silane to react with the resin.

EXAMPLE 12

An impregnating composition embodying an epoxidized polybutadiene is formulated as follows:

| | Parts by weight |
|---|---|
| Epoxidized polybutadiene latex | 30.0 |
| Bis(gamma-aminoallyl)dimethoxy silane | 3.0 |
| Water | 67.0 |

The foregoing impregnant is applied to glass fibers in an amount to deposit between 5 and 20% by weight dry solids in the glass fiber bundle. The impregnated bundle is then dried at 110° C. for one-half hour whereby the amine compound reacts with the epoxy groups in the polymer to form a cross-linked polymer impregnant.

It will be understood by those skilled in the art that a variety of polymers having one or more epoxide groups can be used in lieu of the epoxidized polybutadiene exemplified in Example 12. For example, use can be made of epoxidized polyolefins, epoxidized diene polymers and epoxy resins formed by the reaction of an epihalohydrin (e.g. epichlorohydrin) with a polyhydric phenol such as bis(4 - hydroxyphenyl)-2,2-propane, bis(hydroxyphenyl) methane, hydroquinone, resorcinol, etc. or a polyhydric alcohol such as glycol, polyethylene glycol, sorbitol, glycerol, etc.

As the elastomer compatible material, use can also be made of urethane polymers which can be cross linked by use of the foregoing amines, as represented by the following examples.

EXAMPLE 13

This example illustrates the use of a urethane polymer having an average molecular weight of about 2000 formed by the reaction of toluene diisocyanate with propylene glycol which is end-blocked with phenol, and which is formulated in the following impregnating composition.

| | Parts by weight |
|---|---|
| Urethane polymer | 25.0 |
| Trimethylene triamine | 3.0 |
| Water | 72.0 |

The above composition is used to impregnate a glass fiber bundle in the manner described in Example 5. The bundle is then dried at a temperature of 130° C. for one-half hour in order to cure the methane impregnant.

EXAMPLE 14

The polyurethane used in Example 13 is mixed with bis-(gamma-aminopropyl)diethoxy silane in a ratio of 6 parts by weight of the silane per 100 parts by weight of the polyurethane and the resulting mixture is heated to a temperature of 120° C. for 1 hour.

The resulting cured urethane polymer is then formulated into the following impregnating composition:

| | Percent by weight |
|---|---|
| Reaction product of urethane polymer and amino silane | 30.0 |
| Water | 70.0 |

It will be understood that a variety of other urethane polymers can be used in place of the polymer described above. Urethane polymers contemplated for use in the present invention are those formed of an aliphatic or aromatic polyisocyanate, such as the alkylene diisocyanates, toluene diisocyanates, polymethylene, polyphenyleneisocyanates, etc., with an organic polyhydroxylated compound. Illustrative of the polyhydroxylated compounds are organic polyols, polyether polyol or mixtures of polyols, including glycerol, trimethanol propane, butylene, glycol, polyalkylene glycols, such as polyethylene glycerol, polypropylene glycerol, polybutylene glycerol, or polyhydroxy polyesters, such as the reaction products of a polyhydric alcohol (i.e. glycol, ethylene glycol, propylene glycol) with a polycarboxylic acid, or anhydride, adipic acid, succinic acid, malonic acid, maleic acid, anhydride and the like.

It is desirable to achieve as full impregnation as possible into the bundles of glass fibers in order to more effectively separate the fibers one from the other by the impregnating materials since the solids are effective as a coating on the sized glass fibers to cushion the fibers and to protect the fibers against destruction by mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

More complete protection of the individual glass fibers and a fuller coordination with the elastomeric material can be achieved when the impregnating composition is formulated to contain an anchoring agent such as gamma-aminopropyltriethoxy silane. Instead of gamma-aminopropyltriethoxy silane, in the size or in the impregnating composition, use can be made of other organo silicon atoms containing an amino group, such as gamma-aminovinyldiethoxy silane, gamma-(triethoxysilylpropylamide) propylamine, N(gamma - triethoxysilylpropyl)propylamine, beta-aminoallyltriethoxy silane, and para-aminophenyltriethoxy silane. Use can be made of other organo silicon compounds in the form of a silane, silanol or polysiloxane in which the organic group attached to the silicon atom contains an epoxy group, such as glycydoxypropyltrimethoxy silane or 3,4-epoxy cyclohexylethyltrimethoxy silane as well as silanes of the type disclosed in U.S. Pat. No. 3,484,333. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, B-alanine chromic complex, or glycylate chromic complex.

When use is made of the amino silane anchoring agent of the type described, the amino group on the silane compound may have a tendency to react with the reactive sites in the polymeric impregnant during drying of the impregnated bundle and/or curing or vulcanization of the impregnated bundle when combined with an elastomer in the manufacture of glass fiber reinforced elastomeric products. However, this is not disadvantageous, and further serves to intertie the impregnant with the glass fiber surfaces.

This feature in the invention may be illustrated by the following examples of impregnating compositions embodying a glass fiber anchoring agent:

EXAMPLE 15

| | Percent by weight |
|---|---|
| Amine cross-linked carboxylated butadiene-styrene latex of Example 5 | 30.0 |
| Gamma-aminopropyltriethoxy silane | 1.5 |
| Water | 68.5 |

EXAMPLE 16

| | |
|---|---|
| Melamine formaldehyde resin | 35.0 |
| Bis-(beta-aminoethyl)dimethoxy silane | 2.0 |
| Gamma-aminopropyltrimethoxy silane | 1.0 |
| Water | 62.0 |

EXAMPLE 17

| | |
|---|---|
| Melamine formaldehyde resin | 30.0 |
| Bis(p-aminophenyl)dimethoxy silane | 2.0 |
| Beta-alanine chromic complex | 1.0 |

When use is made of a glass fiber anchoring agent as illustrated by Examples 15 to 17, the anchoring agent generally forms between 0.1 and 5% by weight of the impregnating composition.

While the concepts of the invention have been described above with reference to reacting the amine compound with the polymeric impregnant during drying of the impregnated bundle at an elevated temperature, it will be understood by those skilled in the art that it is also possible to subject the impregnated glass fiber bundle to dielectric treatment in a conventional manner to coagulate the impregnant. Thus, reaction between the amine compound and the polymeric impregnant material will take place during cure or vulcanization of the glass fiber combined with an elastomeric material in the manufacture of glass fiber reinforced elastomeric products since the vulcanization is conducted at elevated temperature.

In accordance with another concept of the present invention, when it is desired to produce a glass fiber bundle having further improved tensile strengths when subjected to compressive forces, it is possible to further treat glass fiber bundles treated in accordance with Examples 5 to 14 to provide a top coating of an adhesive elastomer or adhesive elastomer compatible impregnant in accordance with the double impregnation technique described in copending application Ser. No. 32,974, filed Apr. 19, 1970, now Pat. 3,658,571. This concept of the invention may be illustrated by the following examples.

EXAMPLE 18

This example illustrates the double impregnation of a bundle of glass fibers, wherein the bundle is first impregnated with the impregnating composition of Example 5, followed by impregnation with an adhesive resorcinol aldehyde latex (RFL).

The first impregnation with aqueous composition described in Example 5 is effected in the same general manner used in Example 5. Referring specifically to FIG. 5 of the drawing, the glass fiber bundle 32 is advanced over a guide roller 50 for passage downwardly to the bath 52 containing the impregnating composition of Example 5. The bundle is then turned under roller 54 to effect a sharp bend which operates to open the bundle to enable fuller penetration of the aqueous impregnating composition into the bundle of sized glass fiber for fuller impregnation of the bundle. The impregnated bundle is then raised from the bath for passage through a roller or die 56 which operates to remove excess impregnating composition from the bundle and to work the impregnant into the bundle.

Thereafter, the endless bundle is advanced over roller 58 to roller 60 for passage downwardly into a bath 62 containing the following composition:

| | Percent by weight |
|---|---|
| Natural rubber latex-resorcinol formaldehyde resin (38% solids) "Lotol 5440" | 30.0 |
| Water | 70.0 |

The bundle is turned under rollers 64 and is passed through orifice die 68 which is somewhat smaller than die 56 whereby the passage of said strand 32 through die 68 causes turbulence in the orifice, as well as turbulence immediately before and after the orifice, so that a layer comprising a mixture of RFL and the amine cross-linked carboxylated butadiene-styrene latex is deposited on the glass fiber bundle 32. The bundle is then passed through the remainder of the RFL bath whereby RFL is deposited on the top of the binary layer to form a third layer comprising RFL, the excess of which may be removed by an orifice die having a somewhat larger diameter. Thereafter, the bundle is advanced over roller 72 into a drying oven preferably in the form of an air drying oven maintained at a temperature above ambient temperature, and preferably at a temperature within the range of 65° to 180° C. to accelerate removal of the aqueous composition and to set the impregnating material in situ in the glass fiber bundle. However, it will be understood that dielectric treatment may also be employed in order to coagulate the latices. Drying will occur in a relatively short period, ranging from 1–30 minutes, depending somewhat upon the temperature of the drying oven.

It will be appreciated that limited benefits may be obtained through the use of the concepts of the present invention wherein die 68 is omitted from treating bath 62. In this embodiment, as will be appreciated, the glass fiber bundle will contain an inner coating in the form of an elastomer impregnant and an outer coating in the form of the elastomer compatible material.

The resulting bundle is shown in FIG. 6 and comprises an inner layer 76 of the amine cross-linked latex in which the glass fibers 16 having size coating 24 are dispersed, an intermediate layer 78 on top of layer 76 comprising a binary mixture of RFL and the aminized latex and an outer layer 80 comprising the RFL. However, it will be understood that glass fibers may be subjected to the treatment described in Example 4 without having first been treated with a sizing composition.

Suitable resorcinol formaldehyde resins and combinations thereof with natural rubber latex are marketed by the U.S. Rubber Company under the trade name of "Lotol 5440." For the preparation of same, reference can be made to Canadian Pat. No. 435,754 wherein description is made of the reaction of resorcinol and formaldehyde in the presence of a substantial amount of short-chained alkyl amines for the purposes of stabilizing the reaction and the products formed thereof, as well as the combination of the formed resin with rubber latex.

It will be appreciated that the impregnants of Examples 6 to 17 may be employed in place of the carboxylated butadiene-styrene latex shown in Example 18, as represented by the following example.

EXAMPLE 19

This example illustrates the use of the impregnating composition described in Example 11 having the following composition:

| | Parts by weight |
|---|---|
| Melamine-formaldehyde resin | 25.0 |
| Bis-(beta-aminoethyl) dimethoxy silane | 2.0 |
| Water | 73.0 |

Application to glass fibers which do not contain a size coating thereon is made in the same manner as set forth above in Example 18 and in an amount to deposit dry solids comprising 1–10% by weight of the glass fibers. Subsequent treatment with RFL is made in the same manner as shown in Example 18 in an amount such that the RFL constitutes 2–15% by weight of the glass fiber-elastomer system. Reaction between the melamine formaldehyde resin and the amine compound will occur when the impregnated bundle is subjected to elevated temperatures (i.e., during drying of the bundle and/or vulcanization of the bundle combined with an elastomeric material).

It will be appreciated that the amount of RFL present in the binary intermediate layer may be effectively controlled by means of the size of the orifice or die 68, and the amount of RFL constituting the outer layer may be effectively regulated by controlling the amount of RFL solids present in bath 62 and the size of the orifice or die 70. Impregnant compositions generally contain 5–25% solids by weight.

In accordance with another concept of the present invention, RFL may be replaced by another adhesive elastomer compatible impregnating composition such as one of the type described in U.S. Pat. 3,424,608, as illustrated by the following example.

EXAMPLE 20

Application of the methane impregnating composition of Example 13 is made in the manner described in Example 18. While the bundle is still wet with the neoprene latex, the bundle is passed into bath 62 which contains the following elastomer compatible composition.

| | Parts by weight |
|---|---|
| Resorcinol formaldehyde resin | 2–10 |
| Formaldehyde (37% solution) | 1–3 |
| Concentrated ammonium hydroxide | 2–5 |
| Vinyl pyridine terpolymer (42% solids) | 15–50 |
| Neoprene rubber latex (50% solids) | 25–50 |
| Butadiene latex (60% solids) | 5–15 |
| Alkali metal hydroxide | .05–0.2 |

Water is incorporated into the foregoing materials in amounts to produce an impregnating composition having a minimum solids content of 10% by weight and a maximum solids content of 50% by weight. Application is made in the manner illustrated in FIG. 5.

The vinyl pyridine terpolymer is a terpolymer of about 15 parts pyridine, 70 parts butadiene and 15 parts styrene, and is more fully described in the aforementioned patent. However, it will be understood that the vinyl pyridine terpolymer may be used along to provide the elastomer compatible component in the glass fiber bundle. This concept of the present invention is illustrated by the following example.

EXAMPLE 21

Glass fibers impregnated with the impregnating composition of Example 5 are, while still wet with the neoprene latex, passed into bath 62 which contains the following composition:

| | Percent by weight |
|---|---|
| Vinyl pyridine-butadiene-styrene terpolymer (42% solids) | 25.0 |
| Water | 75.0 |

Application of this impregnant to provide a triple coated glass fiber bundle may be made in the manner described in Example 18 with reference to the RFL system.

As indicated above, use can be made of an adhesive elastomer in place of the RFL and vinyl pyridine terpolymer adhesive elastomer compatible materials described above. In accordance with this embodiment of the invention, a glass fiber bundle is first impregnated with one of the amino-cross-linked impregnating compositions of Examples 5 to 17 and then provided with an adhesive top coating, in accordance with the method described in Example 18, formed by one of the following adhesive elastomer impregnating compositions:

EXAMPLE 22

| | Percent by weight |
|---|---|
| Natural rubber latex (50% solids) | 30.0 |
| Water | 70.0 |

EXAMPLE 23

| | |
|---|---|
| Neoprene rubber latex (50% solids) | 25.0 |
| Water | 75.0 |

EXAMPLE 24

| | |
|---|---|
| Butadiene-styrene copolymer latex (40% solids) | 32.0 |
| Water | 68.0 |

In accordance with yet another concept of the invention, while not equivalent to the amine cross-linked polymeric impregnants described, use can be made of various other polymeric materials as the first impregnant in the preparation of glass fiber bundles having improved tensile strengths by the double impregnation methods described above. Polymeric impregnants contemplated for use with this concept of the invention include polyamides, polyesters and mixtures of cellulose xanthates with resorcinol aldehyde latices and/or vinyl pyridine-butadiene-styrene terpolymer latices. This concept of the invention can be represented by the following examples.

EXAMPLE 25

This example illustrates the use of a polyamide as the first impregnant, followed by an adhesive top coating of an adhesive elastomer compatible material or an adhesive elastomer.

| | Percent by weight |
|---|---|
| Polyamide resin (formed by reaction of adipic acid and hexamethylene diamine) | 30.0 |
| Water | 70.0 |

Application of the foregoing polyamide impregnating composition is made in the manner described in Example 18. While the impregnated bundle is still wet with the polyamide impregnant, it is further impregnated with an adhesive RFL composition by the method illustrated in FIG. 5.

It will be understood that solutions of the foregoing polyamide in an alcohol may be used in lieu of the aqueous suspensoid exemplified. In addition, use can also be made of polyesters (e.g. those formed by the reaction of a polybasic acid such as phthalic anhydride, maleic acid, fumaric acid and the like with a polyhydric alcohol such as glycerin, glycol and the like) as well as mixtures of a cellulose xanthate of the formula:

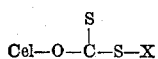

wherein "Cel" represents a cellulose group and X is a group selected from the group consisting of hydrogen and alkali metal such as sodium, potassium, lithium, etc. with RFL and/or vinyl pyridine-butadiene-styrene terpolymer latices. The use of xanthates is represented by the following examples.

EXAMPLE 26

| | Percent by weight |
|---|---|
| Sodium cellulose xanthate | 20.0 |
| Natural rubber latex-resorcinol formaldehyde resin (38% solids—"Lotol 5440") | 10.0 |
| Water | 70.0 |

The foregoing impregnating composition is applied to glass fiber bundle, followed by impregnation with an RFL impregnant in the manner described in Example 8.

In formulating the xanthate impregnating composition with the adhesive elastomer compatible material, it has been found that best results are achieved when the latter is employed in an amount constituting between 10-70% by weight of the xanthate.

Another example of the use of xanthates is as follows:

EXAMPLE 27

| | Percent by weight |
|---|---|
| Potassium cellulose xanthate | 25.0 |
| Vinyl pyridine-styrene-butadiene terpolymer | 7.0 |
| Water | 68.0 |

Following impregnation with the above, the glass fiber bundle is provided with an adhesive top coating of a neoprene rubber latex in the manner described in Example 18.

It will be understood by those skilled in the art that either one, or both, of each of the impregnating compositions used in Examples 18 to 27 can be modified to include one of the glass fiber anchoring agents described above to further facilitate integration of the glass fibers with elastomeric materials in the manufacture of glass fiber reinforced elastomeric products. The anchoring agents generally comprise between .1 and 5.0% by weight of the impregnating composition.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber elastomeric product.

It will be apparent that I have provided a new and improved method for use in the treatment of bundles of glass fibers to enhance their integration with elastomeric materials in the manufacture of glass fiber-elastomeric products.

It will be understood that invention exists not only in the treated glass fibers for use with elastomeric materials but that inveniton exists also in the process in which the compositions are employed in the treatment of glass fibers as well as the treated or impregnated glass fiber products formed thereof.

It will be understood that changes may be made in the details of formulation and methods of application for use without departing from the spirit of the invention, especially defined in the following claims.

What is claimed is:

1. In the manufacture of glass fiber-elastomeric products in which the elastomeric material comprises a continuous phase in which the glass fibers are distributed, the treatment of glass fibers which is effective to establish a strong bonding relationship between the glass fibers and the elastomeric material comprising impregnating a glass fiber bundle with a first composition comprising a polymeric material selected from the group consisting of carboxylated copolymers of butadiene and styrene, melamine aldehyde resins, polyepoxide resins, polyurethane resins, acrylic resins and polyesters and a diamine in an amount sufficient to cross-link the polymeric material to form an inner layer of said first composition in said glass fiber bundle, providing an intermediate impregnant layer comprising a mixture of said first composition and an adhesive material, and further coating the resulting bundle with the adhesive material to form a top coating on the glass fiber bundle of said adhesive material.

2. A method as defined in claim 1 wherein said intermediate layer is formed by passing the glass fibers which are still wet with said first composition into a bath of a second composition containing said adhesive material, said bath having immersed therein an orifice through which the glass fibers are passed whereby turbulence is created in the vicinity of said orifice to intermix said first composition with said adhesive material.

3. A method as defined in claim 1 wherein said adhesive material is an adhesive elastomer or an adhesive elastomer compatible material.

4. A method as defined in claim 1 wherein said polymeric material has been reacted with the diamine prior to application of the first composition to the bundle.

5. A method as defined in claim 1 wherein said diamine is selected from the group consisting of alkylene diamines, polyethylene polyamines, polyethylene imines and diamino organo silicon compounds selected from the group consisting of polyamino silanes of the formula

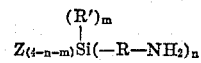

wherein Z is selected from the group consisting of hydrogen and a readily hydrolyzable group, $n$ is an integer between 2 and 3, $m$ is an integer from 0 to 1, R' is alkyl and R is a divalent organic group, the corresponding silanols and polysiloxanes.

6. A method as defined in claim 1 wherein said impregnant constitutes between 5 and 30% by weight of the glass fiber system.

7. A method as defined in claim 1 wherein the individual glass fibers comprising the bundle have a thin size coating thereon.

8. A method as defined in claim 1 wherein said diamine is present in an amount corresponding to between 1 and 50 parts by weight per 100 parts by weight of the polymeric material.

9. A method as defined in claim 1 wherein the first composition also includes a glass fiber anchoring agent.

10. A method as defined in claim 1 which includes the step of subjecting the resulting bundle to an elevated temperature to cause the diamine to react with the polymeric material to provide a cross-linked polymeric material in the glass fiber bundle.

11. A method as defined in claim 10 wherein said temperature is a temperature within the range of 65° to 180° C.

12. A method as defined in claim 10 wherein said bundle is dried at an elevated temperature.

13. A method as defined in claim 10 which includes the step of subjecting said bundle to an elevated temperature during vulcanization of the bundle combined with an elastomeric material.

14. A method as defined in claim 1 wherein the inner layer constitutes between 1–10% by weight of the glass fiber system.

15. A method as defined in claim 1 wherein the top coating constitutes between 2–15% by weight of the glass fiber inner layer system.

16. A method as defined in claim 10 wherein at least one of said first composition and said adhesive material contains an anchoring agent.

17. A glass fiber bundle having three impregnant layers therein, the first of said impregnant layers comprising a polymeric material selected from the group consisting of carboxylated copolymers of butadiene and styrene, melamine-aldehyde resins and polyesters and a diamine in an amount sufficient to cross-link the polymeric material, the second impregnant layer comprising a mixture of said polymeric material, said diamine and an adhesive material and the third impregnant layer comprising top coating in the form of an adhesive material.

18. A glass fiber bundle as defined in claim 17 wherein said adhesive material is an adhesive elastomer or an adhesive elastomer compatible material.

19. A glass fiber bundle as defined in claim 17 wherein said polymeric material has been reacted with the diamine prior to application of the polymeric material to the bundle.

20. A glass fiber bundle as defined in claim 17 wherein said diamine is selected from the group consisting of alkylene diamines, polyethylene polyamines, polyethylene imines and diamino organo silicon compounds selected from the group consisting of polyamino silanes of the formula

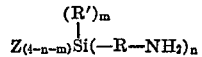

wherein Z is selected from the group consisting of hydrogen and a readily hydrolyzable group, $n$ is an integer between 2 and 3, $m$ is an integer from 0 to 1, R' is alkyl and R is a divalent organic group, the corresponding silanols and polysiloxanes.

21. A glass fiber bundle as defined in claim 17 wherein the total weight of said impregnant layers constitutes between 5 and 30% by weight of the glass fiber system.

22. A glass fiber bundle as defined in claim 17 wherein the individual glass fibers comprising the bundle have a thin size coating thereon.

23. A glass fiber bundle as defined in claim 17 wherein at least one of said impregnant layers also includes a glass fiber anchoring agent.

24. A glass fiber bundle as defined in claim 17 wherein said diamine is present in an amount corresponding to between 1 and 50 parts by weight per 100 parts by weight of the polymeric material.

25. A glass fiber bundle as defined in claim 17 which has been subjected to an elevated temperature subsequent to impregnation to cause the diamine to react with the polymeric material to provide a cross-linked impregnation in the glass fiber bundle.

26. A glass fiber bundle as defined in claim 25 wherein said temperature is a temperature within the range of 65° to 180° C.

27. A glass fiber bundle as defined in claim 25 wherein said bundle has been subjected to drying at an elevated temperature.

28. A glass fiber bundle as defined in claim 17 wherein said adhesive material is an adhesive elastomer compatible material.

References Cited
UNITED STATES PATENTS

| | | | |
|---|---|---|---|
| 3,413,186 | 11/1968 | Marzocchi | 117—72 |
| 3,234,042 | 2/1966 | Marzocchi et al. | 117—126 GB |
| 3,252,825 | 5/1966 | Marzocchi et al. | 117—126 GN |
| 3,473,950 | 10/1969 | Wong | 117—75 T |
| 3,207,623 | 9/1965 | Marzocchi et al. | 117—126 GB |
| 3,414,432 | 12/1968 | Mertzweiller et al. | 117—126 GB |

WILLIAM D. MARTIN, Primary Examiner

D. COHEN, Assistant Examiner

U.S. Cl. X.R.

117—113, 126 GB, GN; 161—144